(12) United States Patent
Ruby, III et al.

(10) Patent No.: US 8,397,581 B2
(45) Date of Patent: Mar. 19, 2013

(54) PINCH SENSOR WITH DOOR SEAL

(75) Inventors: Joseph Patrick Ruby, III, Marysville, OH (US); Yoshitomo Ihashi, Dublin, OH (US)

(73) Assignee: Honda Motor Co. Ltd., Tokyo (JP)

( * ) Notice: Subject to any disclaimer, the term of this patent is extended or adjusted under 35 U.S.C. 154(b) by 366 days.

(21) Appl. No.: 12/748,957

(22) Filed: Mar. 29, 2010

(65) Prior Publication Data

US 2011/0232391 A1 Sep. 29, 2011

(51) Int. Cl.
*G01L 1/00* (2006.01)
(52) U.S. Cl. .......................................................... 73/768
(58) Field of Classification Search ...................... 73/768
See application file for complete search history.

(56) References Cited

U.S. PATENT DOCUMENTS

| | | | |
|---|---|---|---|
| 3,056,628 A | 10/1962 | Golde | |
| 5,459,962 A | 10/1995 | Bonne et al. | |
| 5,592,060 A | 1/1997 | Racine et al. | |
| 5,847,289 A | 12/1998 | Lehnen | |
| 6,076,886 A | 6/2000 | Petri et al. | |
| 6,086,138 A | 7/2000 | Xu et al. | |
| 6,186,586 B1 | 2/2001 | Lindinger | |
| 6,297,605 B1 | 10/2001 | Butler et al. | |
| 6,337,549 B1 | 1/2002 | Bledin | |
| 6,339,305 B1 | 1/2002 | Ishihara et al. | |
| 6,375,254 B1 | 4/2002 | Patz | |
| 6,668,660 B2 * | 12/2003 | Ishihara et al. | 73/756 |
| 6,955,079 B2 * | 10/2005 | Ishihara et al. | 73/114.01 |
| 7,000,352 B2 | 2/2006 | Ishihara et al. | |
| 7,162,928 B2 | 1/2007 | Shank et al. | |
| 7,958,672 B2 * | 6/2011 | Ishihara | 49/26 |
| 8,159,231 B2 * | 4/2012 | Sakamaki | 324/663 |
| 2005/0012484 A1 | 1/2005 | Gifford et al. | |
| 2005/0117270 A1 | 6/2005 | Scherraus | |

FOREIGN PATENT DOCUMENTS

| | | |
|---|---|---|
| JP | 57194117 | 11/1982 |
| JP | 06255361 | 9/1994 |
| JP | 08127238 | 5/1996 |
| JP | 11016441 | 1/1999 |
| JP | 11236784 | 8/1999 |
| JP | 2000103228 | 4/2000 |
| JP | 2001153734 | 6/2001 |
| JP | 2001183246 | 7/2001 |
| JP | 2001241262 | 9/2001 |
| JP | 2002205608 | 7/2002 |
| JP | 2004176426 | 6/2004 |
| JP | 2005075085 | 3/2005 |
| JP | 2007083927 | 4/2007 |

* cited by examiner

*Primary Examiner* — Lisa Caputo
*Assistant Examiner* — Octavia Davis-Hollington
(74) *Attorney, Agent, or Firm* — Clifford B. Vaterlaus; Emerson Thomson Bennett (57) ABSTRACT

A sensor apparatus may include an attachment member operatively attached to a closure member of an associated vehicle, a sensor housing substantially enclosing an associated pinching sensor, a neck portion connecting the sensor housing to the attachment member, and a seal extending from the neck portion and contacting a body portion of the associated vehicle when the closure member is in a closed position.

20 Claims, 7 Drawing Sheets

PINCH SENSOR WITH DOOR SEAL

I. BACKGROUND

A. Field of Invention

The present invention relates generally to vehicle door and window pressure sensors, and more specifically to pressure sensors used with automatic doors or windows.

B. Description of the Related Art

It is well known in the automotive industry to include pressure sensors (pressure-activated sensors) for door and window openings, especially for automatic or motorized door and window systems. Pressure sensors are used in passenger vehicles and in other applications for use in preventing an automatic powered door or window from forcibly closing over an obstruction, such as the arms, legs, or fingers of a passenger. The pressure sensors are typically referred to as "pinch sensors." The pressure or pinch sensor detects when an object is pinched between the door and the door frame or the window and the window frame. The pressure or pinch sensor prevents the door or window from closing and causing damage to the pinched object.

Various mechanisms have been used to detect when a object is pinched between the door or window and the vehicle body. While these mechanism function well for their intended use, there are disadvantages. One disadvantage is the pressure or pinch sensor may not detect an object when the object is offset to one side of the sensor.

Therefore, what is needed is an apparatus for detecting when an object is pinched in a closing door or window, in which the apparatus includes a door or window seal.

II. SUMMARY

According to one embodiment of this invention, a sensor apparatus comprises: an attachment member defining an interior having a plurality of ribs, the attachment member including a first end rib located near a top portion of the attachment member, the attachment member including substantially parallel first and second side members and a base member substantially perpendicular to the first and second side members, wherein the first end rib is larger than any of the plurality of ribs, and wherein the attachment member is adapted to receive a portion of a closure member of an associated vehicle within the interior; a sensor housing defining an interior and substantially enclosing an associated pinching sensor within the interior, the sensor housing adjacent the base member of the attachment member; a neck portion connecting the sensor housing to the base member of the attachment member; and a seal extending from the neck portion, the seal including an intermediate pivot point located between the neck portion and a distal end of the seal, the seal including an outer portion extending from the intermediate pivot point to the distal end, wherein the outer portion of the seal pivots about the intermediate pivot point when the seal contacts a body portion of the associated vehicle when the closure member is in a closed position. In another embodiment, the first and second side members of the attachment member are substantially equal in length and the base member of the attachment member is substantially shorter than the first and second side members. In another embodiment, the first side member includes the first end rib and the second side member includes a second end rib, wherein the first and second end ribs are substantially the same size. In another embodiment, the neck portion includes substantially more material on a first side of the neck portion than on the second side of the neck portion. In another embodiment, the seal extends from the first side of the neck portion. In another embodiment, the neck portion includes substantially more material between the sensor housing and the first side member of the attachment member than between the sensor housing and the second side member of the attachment member. In another embodiment, the seal extends from between the sensor housing and the first side member of the attachment member. In another embodiment, a center of the interior of the sensor housing is located substantially equidistant from the first and second side members of the attachment member. In another embodiment, a center of the interior of the sensor housing is substantially aligned with both a center of the interior of the attachment member and a center of the base of the attachment member. In another embodiment, the sensor housing is located between a plane defined by an exterior surface of a length of the first side member and a plane defined by an exterior surface of a length of the second side member. In another embodiment, the sensor housing is substantially circular. In another embodiment, the intermediate pivot point has substantially less material than the adjacent portions of the seal.

According to another embodiment of this invention, a sensor apparatus comprises: an attachment member defining an interior having a plurality of ribs, the attachment member including substantially parallel first and second side members and a base member substantially perpendicular to the first and second side members, wherein the attachment member is adapted to receive a portion of a closure member of an associated vehicle within the interior; a sensor housing defining an interior and substantially enclosing an associated pinching sensor within the interior, the sensor housing adjacent the base member of the attachment member, the sensor housing located substantially equidistant from the two side members of the attachment member; a neck portion connecting the sensor housing to a bottom portion of the attachment member, the neck portion including substantially more material on a first side of the neck portion than on the second side of the neck portion, wherein the ratio of a width of the first side of the neck portion to a width of the second side of the neck portion is between 1.2 and 2.5, wherein the ratio of a width of the interior of the sensor housing to the width of the first side of the neck portion is between 0.8 and 1.8; and a seal extending from the first side of the neck portion, wherein a distal end of the seal contacts a body portion of the associated vehicle when the closure member is in a closed position. In another embodiment, the ratio of the width of the first side of the neck portion to the width of the second side of the neck portion is between 1.2 and 2.0. In another embodiment, the ratio of the width of the first side of the neck portion to the width of the second side of the neck portion is between 1.5 and 2.0. In another embodiment, the ratio of the width of the first side of the neck portion to the width of the second side of the neck portion is between 1.6 and 1.8. In another embodiment, the ratio of the width of the interior of the sensor housing to the width of the first side of the neck portion is between 1.0 and 1.6. In another embodiment, the ratio of the width of the interior of the sensor housing to the width of the first side of the neck portion is between 1.2 and 1.5. In another embodiment, the ratio of the width of the interior of the sensor housing to the width of the first side of the neck portion is between 1.3 and 1.5.

According to another embodiment of this invention, a sensor apparatus comprises: an attachment member defining an interior and including a plurality of ribs within the interior, wherein the attachment member is substantially U-shaped with first and second side members substantially parallel and substantially equal in length and a base member substantially shorter than the first and second side members and substantially perpendicular to the first and second side members, wherein the attachment member is adapted to receive a portion of a closure member of an associated vehicle within the interior, wherein the attachment member includes at least one end rib located near a top portion of the first side member, wherein the at least one end rib is larger than any of the plurality of ribs; a sensor housing substantially enclosing and defining an interior for receiving an associated pinching sensor, the sensor housing located adjacent the base member of the attachment member, the sensor housing located substantially equidistant from the first and second side members of the attachment member, wherein a center of the interior of the sensor housing is substantially aligned with both a center of the interior of the attachment member and a center of the base of the attachment member, wherein the sensor housing is located between a plane defined by an exterior surface of a length of the first side member and a plane defined by an exterior surface of a length of the second side member; a neck portion connecting the sensor housing to the base member of the attachment member, the neck portion including substantially more material between the sensor housing and the first side member of the attachment member than between the sensor housing and the second side member of the attachment member; and a seal extending from the neck portion between the sensor housing and the first side member of the attachment member, the seal including an intermediate pivot point located between the neck portion and a distal end of the seal, the seal including an outer portion extending from the intermediate pivot point to the distal end, wherein the outer portion pivots about the intermediate pivot point when the seal contacts a body portion of the associated vehicle.

According to another embodiment of this invention, a sensor apparatus comprises: an attachment member for attachment to a closure member; a pinch sensor connected to the attachment member through a neck portion; and a seal extending from the neck portion, the seal having a hinge located between the neck portion and a distal end of the seal, the hinge defined by a portion of the seal that is thinner than adjacent portions of the seal.

One advantage of this invention is the integrated pinch sensor and door seal. Another advantage of this invention is a greater operating angle or range for detecting objects pinched between a door or window and the vehicle body.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
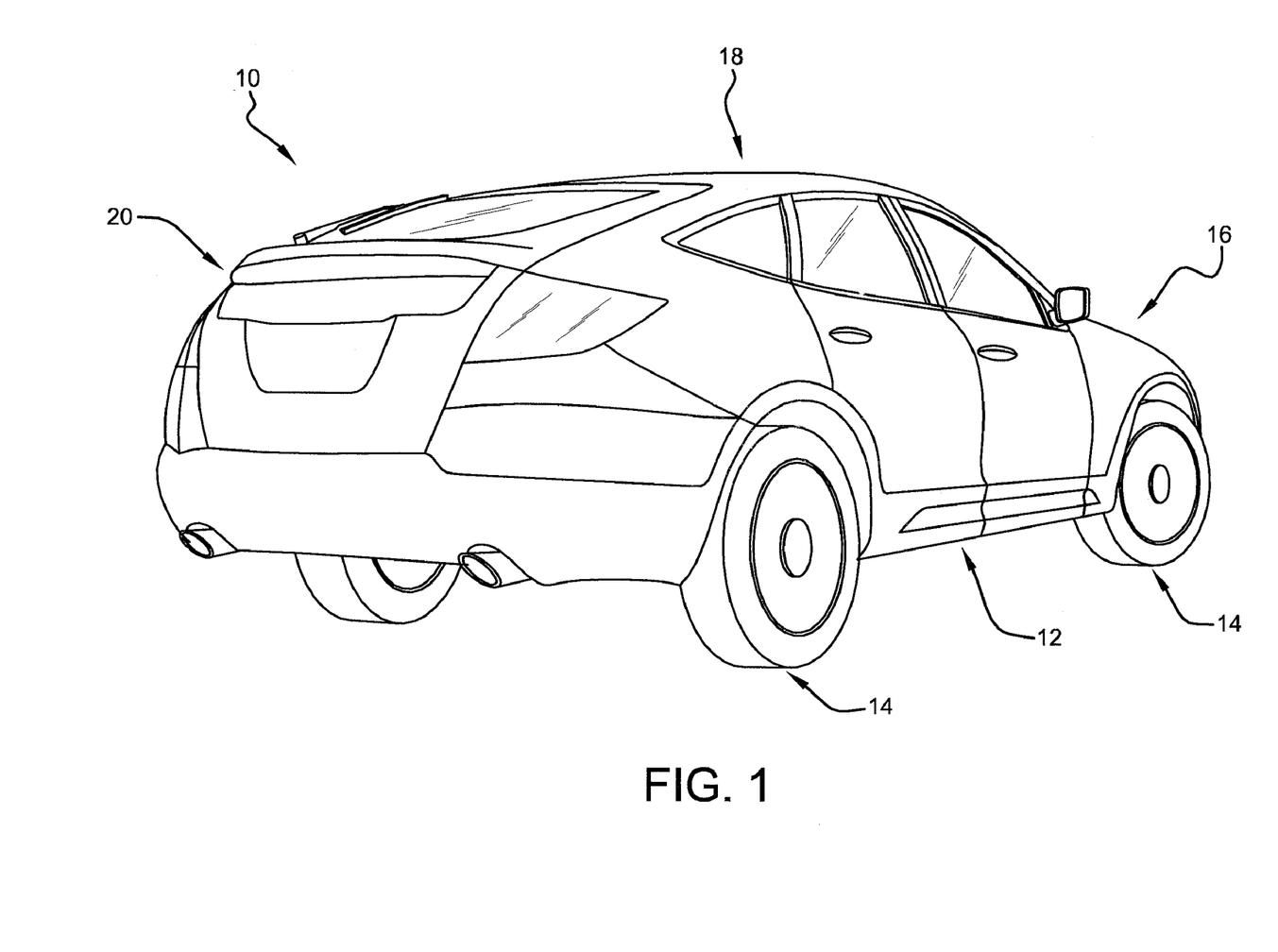
FIG. 1 is a rear perspective view of a vehicle with a rear hatch in a closed position, according to one embodiment.
Figure 2:
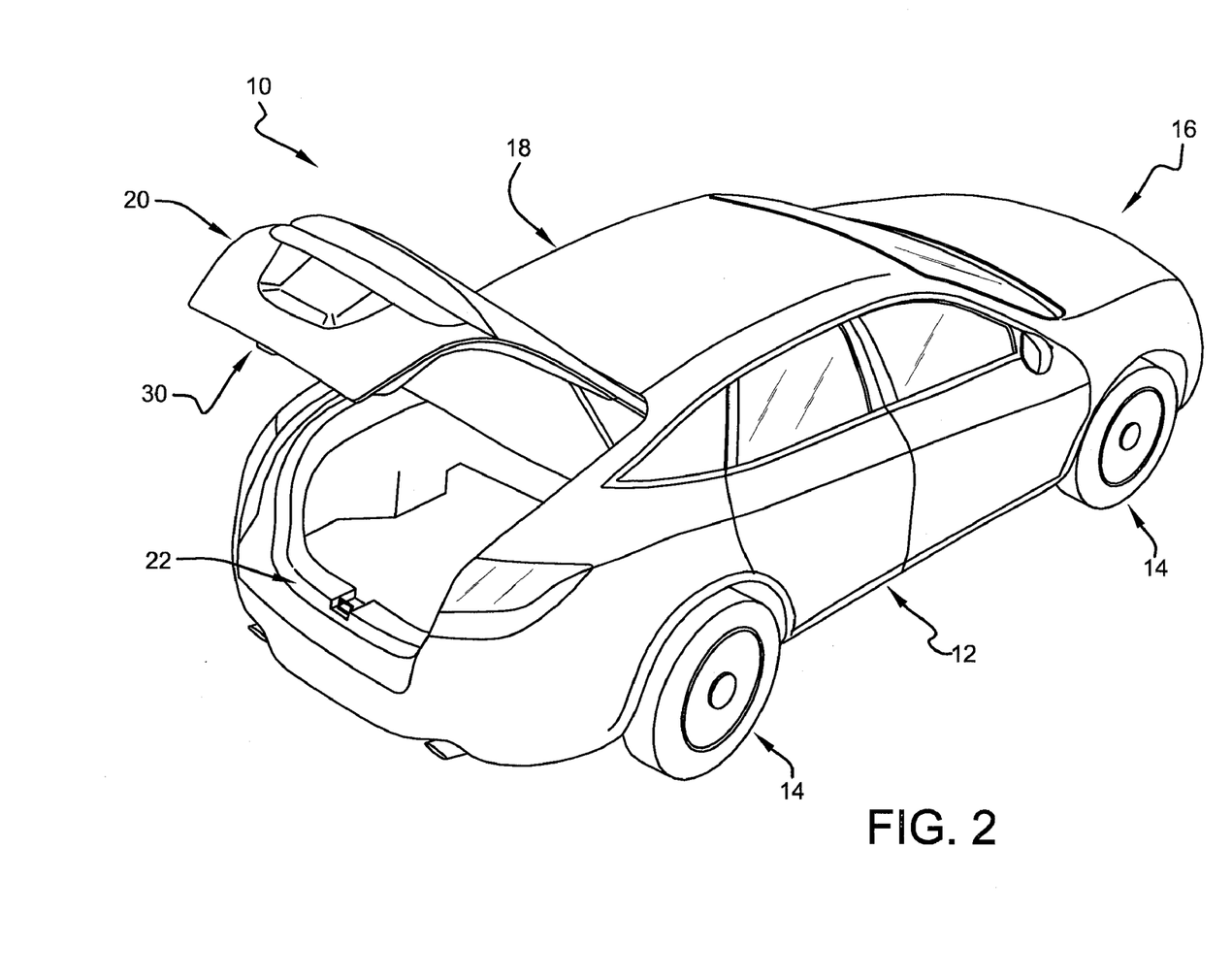
FIG. 2 is a rear perspective view of a vehicle with a rear hatch in an open position, according to one embodiment.
Figure 3:
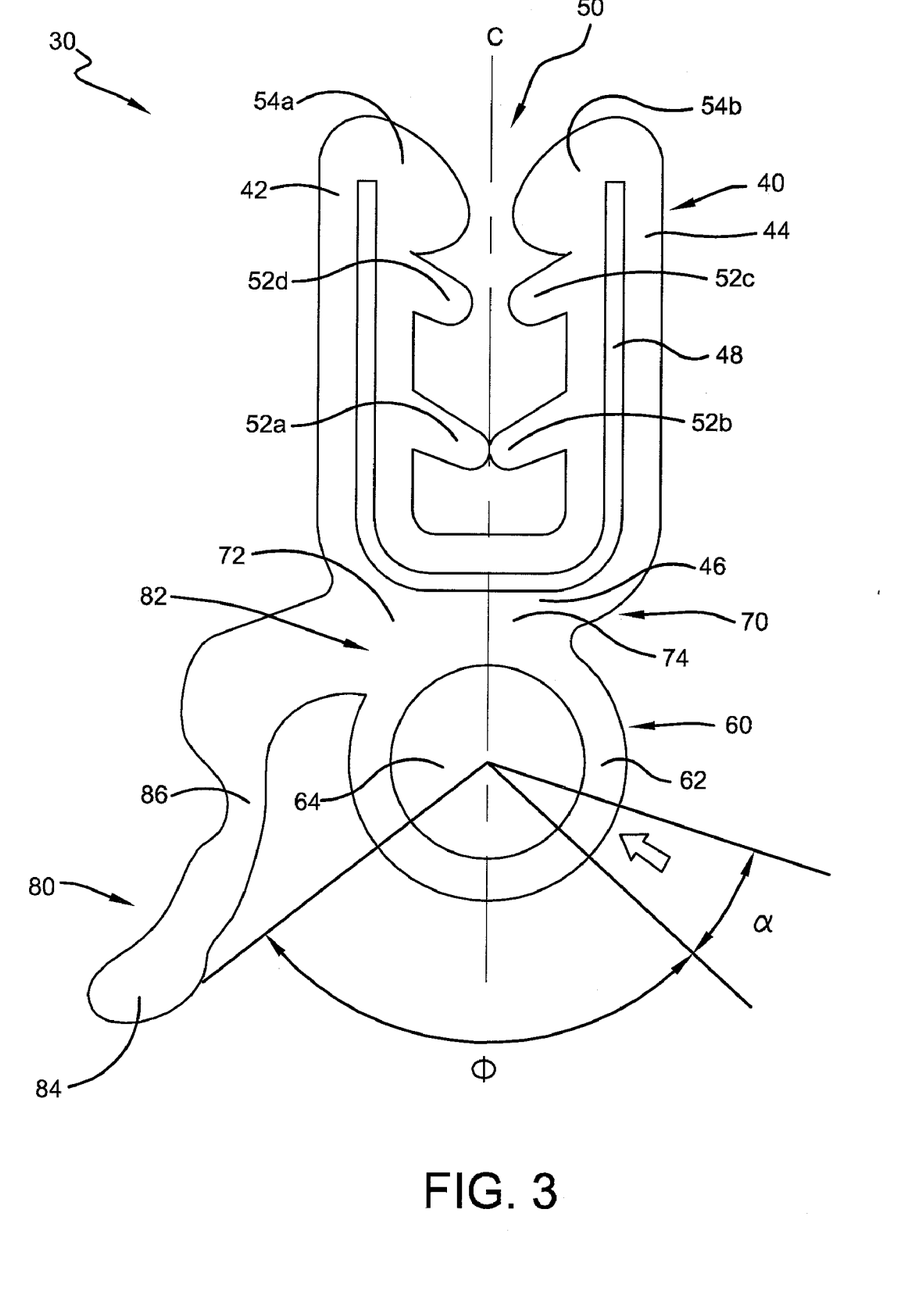
FIG. 3 is a cross-sectional view of the sensor showing the operational range, according to one embodiment.

Referring now to the drawings wherein the showings are for purposes of illustrating embodiments of the invention only and not for purposes of limiting the same, and wherein like reference numerals are understood to refer to like components, FIGS. 1 and 2 show a vehicle 10, which may be equipped with sensor apparatus 30 according to one embodiment of this invention. It should be understood that this invention will work with any vehicle including, but not limited to, any automobile, truck, pickup truck, sport utility vehicle (SUV), and crossover vehicle. The vehicle 10 may include a frame 12, one or more ground engaging wheels 14 mounted to the frame 12, and a locomotion source 16, mounted to the frame 12, for use in providing locomotion for the vehicle 10. The vehicle 10 may include have a passenger compartment 18 which can house one or more passengers as is well known in the art. The vehicle 10 may also include a closure member 20. For some non-limiting examples, the closure member 20 can be a door, a tailgate, a hatch, a trunk lid, a window, a sunroof or moon roof, or a sliding door. The sensor apparatus 30 can be attached to either the closure member 20 or the vehicle body or closure member frame 22.

With reference now to FIGS. 3-6, the sensor apparatus 30 may include an attachment member 40, a sensor housing 60, and a seal 80. The sensor apparatus 30 can be formed of any material chosen with ordinary skill in the art. In one embodiment, the sensor apparatus 30 is formed of EPDM rubber. The attachment member 40 may include two side members 42, 44 and a base member 46. The attachment member 40 may include a metal support structure 48. The attachment member 40 may include a plurality of ribs 52a, 52b, 52c, 52d located within an interior 50. The attachment member 40 may include end ribs 54a, 54b to improve the position control of the sensor apparatus 30. The attachment member 40 can be substantially symmetrical about a center line C. The interior 50 can receive a portion of the closure member 20. In one embodiment, the interior 50 receives a bracket 24 attached to the closure member 20. One or more of the shape of the attachment member 40, the plurality of ribs 52a, 52b, 52c, 52d, and the end ribs 54a, 54b can secure the attachment member 40 to the closure member 20.

With continuing reference now to FIGS. 3-6, the sensor housing 60 may include a sheath or casing member 62, which substantially encloses and defines an interior 64 for receiving a pressure sensor or pinch sensor 100, as is well known in the art. The sensor housing 60 can be connected to the attachment member 40 by a neck member 70. In one embodiment, the neck member 70 is asymmetrical about a center line C. The neck member 70 may have substantially more material on a left side 72 of the center line C than a right side 74 of the center line C. This extra material stiffens the sensor housing 60 from external forces acting on the sensor housing 60 in the area indicated by angle alpha ($\alpha$) in FIG. 3. With this extra material, the sensor housing 60 compresses from external forces acting on the sensor housing 60 in the area indicated by angle phi ($\Phi$) and angle alpha ($\alpha$). Thus, the sensor housing 60 has a larger operational range for external forces acting on the sensor housing 60 in the area indicated by both angle phi (Φ) and angle alpha (α). In contrast, without this extra material, external forces acting on the sensor housing 60 in the area indicated by angle alpha (α) do not compress the sensor housing 60.

Figure 4:
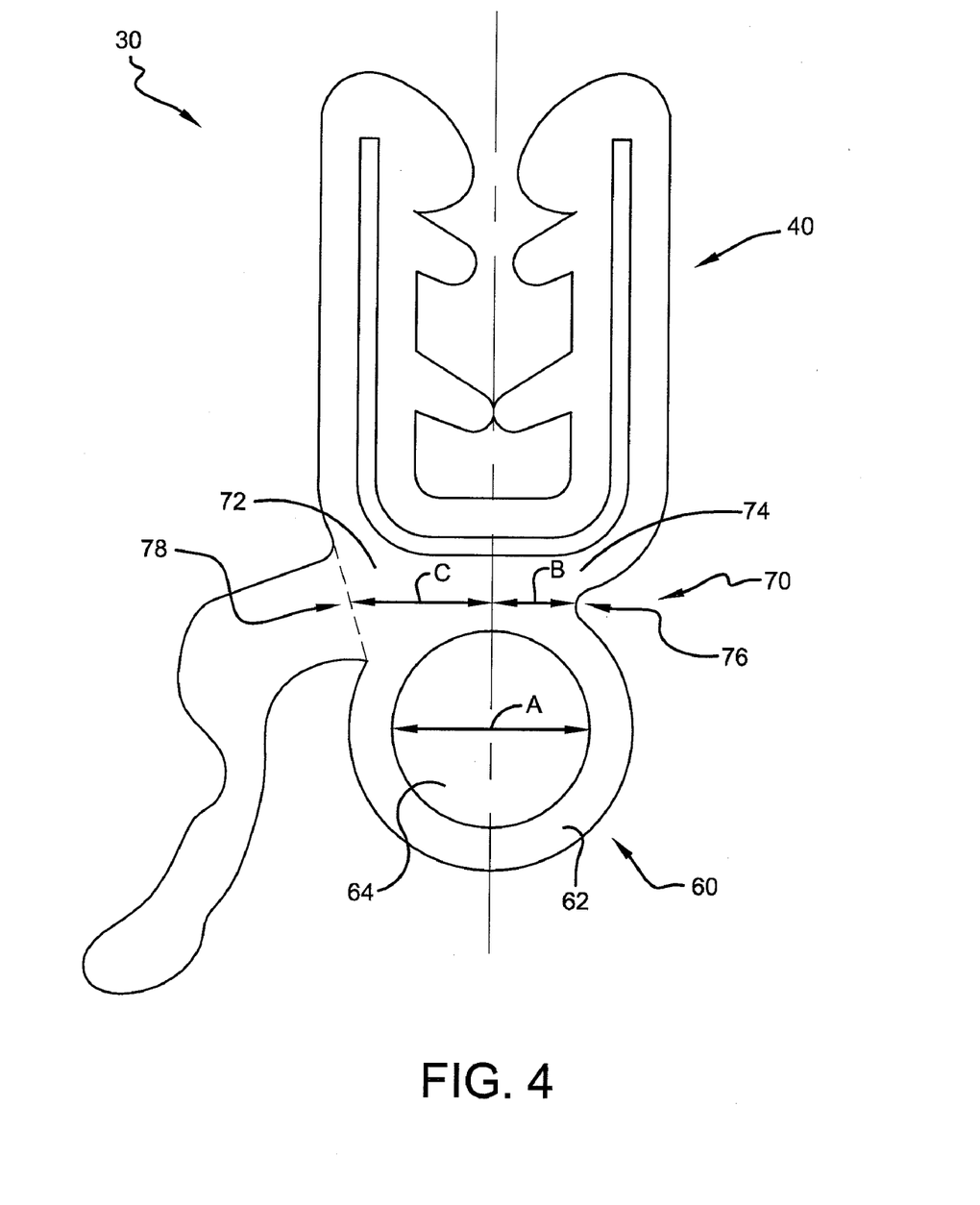
FIG. 4 is the cross-sectional view of the sensor showing the relative dimensions, according to one embodiment.

With continuing reference now to FIG. 4, the sensor apparatus 30 has a dimension A, a dimension B, and a dimension C. Dimension A is the size of the interior 64 of the sensor housing 60. In one embodiment, interior 64 is substantially circular and dimension A is the diameter of the substantially circular interior 64. Dimension B is the distance between the center line C and an outer surface 76 of the right side 74 of the neck member 70. Dimension C is the distance between the center line C and a transition area 78 between the neck member 70 and the seal 80 on the left side 72. The ratio of dimension A to dimension B (A:B or A/B) is between 2.0 and 3.0. In one embodiment, the ratio of dimension A to dimension B is between 2.0 and 2.5. In another embodiment, the ratio of dimension A to dimension B is between 2.2 and 2.5. In a more specific embodiment, the ratio of dimension A to dimension B is between 2.3 and 2.4. The ratio of dimension A to dimension C is between 0.8 and 1.8. In one embodiment, the ratio of dimension A to dimension C is between 1.0 and 1.6. In another embodiment, the ratio of dimension A to dimension C is between 1.2 and 1.5. In a more specific embodiment, the ratio of dimension A to dimension C is between 1.3 and 1.5. The ratio of dimension C to dimension B is between 1.2 and 2.5. In one embodiment, the ratio of dimension C to dimension B is between 1.2 and 2.0. In another embodiment, the ratio of dimension C to dimension B is between 1.5 and 2.0. In a more specific embodiment, the ratio of dimension C to dimension B is between 1.6 and 1.8.

With continuing reference to FIGS. 3-6, the seal 80 can extend from the neck member 70. The seal 80 may include a proximal end 82 and a distal end 84. The proximal end 82 can form a portion of the left side 72 of the neck member 70. The seal may include an intermediate pivot point 86 between the proximal end 82 and the distal end 84. The intermediate pivot point 86 may have substantially less material than the adjacent portions of the seal 80. The intermediate pivot point 86 can be substantially thinner than the adjacent portions of the seal 80. This thinner portion 86 of the seal 80 creates a hinge for the distal end 84 of the seal 80 to pivot about. The portion of the seal 80 from the intermediate pivot point 86 and the proximal end 82 may remain substantially stationary with respect to the neck member 70 when the distal end 84 pivots about the intermediate pivot point 86. When the closure member 20 is in the closed position, shown in FIG. 5, the seal 80 contacts the vehicle body or closure member frame 22.

Figure 7:
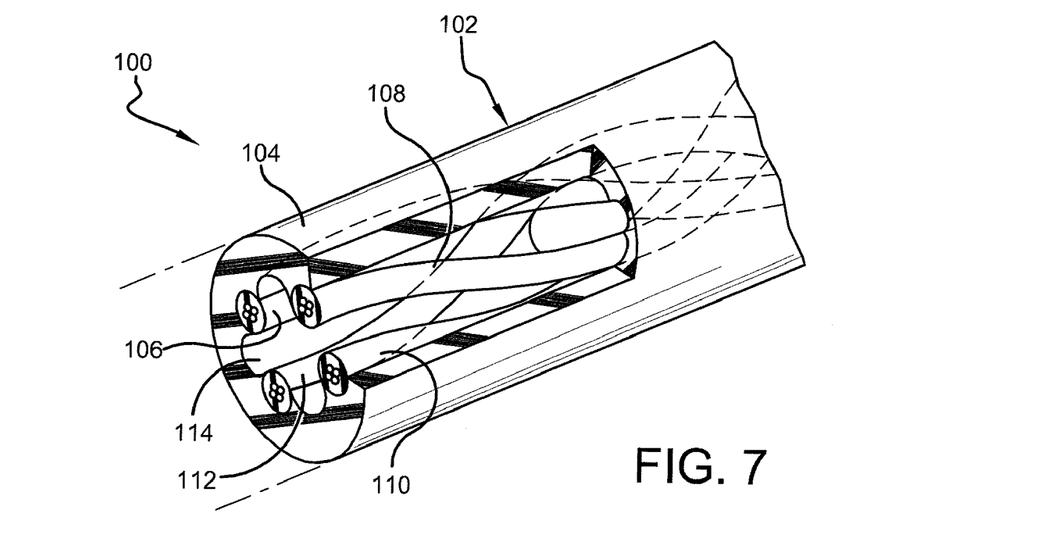
FIG. 7 is a partial cut-away view of a pinch sensor, according to one embodiment.
Figure 8:
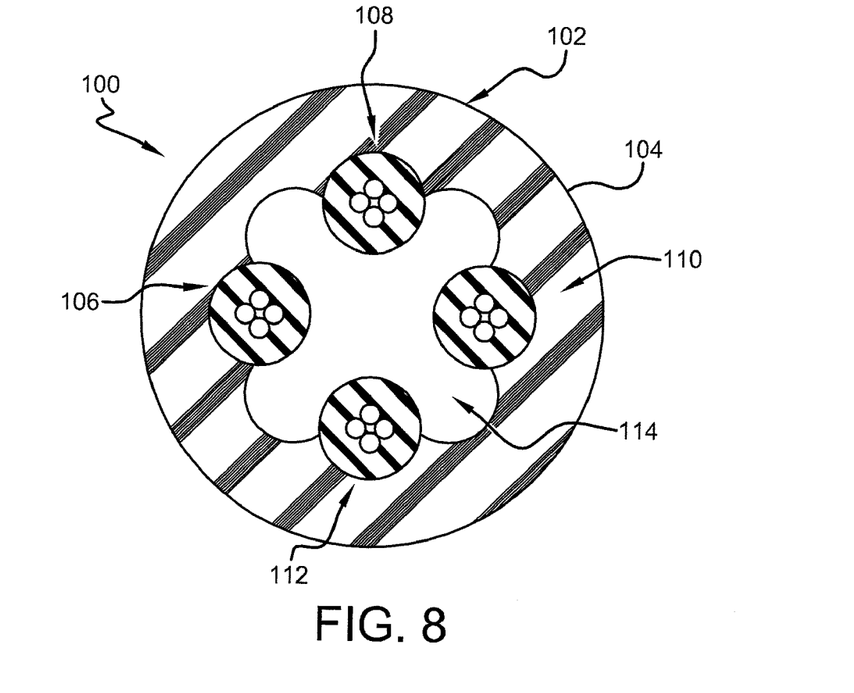
FIG. 8 is a cross-sectional view of a pinch sensor, according to one embodiment.

With reference now to FIGS. 7 and 8, one embodiment of the pressure sensor 100 is shown and described. It will be appreciated that other types of pressure sensors may be used within the scope of the present disclosure. The pressure sensor 100 includes a main body 102 with a substantially circular cross section. The main body 102 includes an outer sheath portion 104 and four electrode wires 106, 108, 110, 112. The outer sheath portion 104 is made of a resilient dielectric material such as a rubber material or a soft synthetic resin material. The outer sheath portion 104 includes an aperture 114, which has an X-shaped cross section. The aperture 114 progressively varies its circumferential position about a center axis of the outer sheath portion 104 along the longitudinal direction of the outer sheath portion 104. Each one of four radial ends of the aperture 114 shifts its circumferential position along a corresponding spiral path in the longitudinal direction of the outer sheath portion 104. Each of the four electrode wires 106, 108, 110, 112 is a resilient stranded wire, which is formed by stranding a plurality of electrically conductive wires. Each of the four electrode wires 106, 108, 110, 112 is covered with an electrically conductive rubber. The electrode wires 106, 108, 110, 112 are radially spaced from each other across the aperture 114 and are spirally wound along a length of the outer sheath portion 104. The electrode wires 106, 108, 110, 112 are integrally secured to the inner peripheral surface portion of the outer sheath portion 104. Thus, when the outer sheath portion 104 is resiliently deformed by the application of an external force, the electrode wires 106, 108, 110, 112 are flexed. When the outer sheath portion 104 is resiliently deformed until the electrode wire 106 or 110 contacts with the electrode wire 108 or 112, an electrical current is formed between the contacting wires. When the outer sheath portion 104 is restored to its original shape, the electrode wires 106, 108, 110, 112 are also restored to their original shape.

Figure 5:
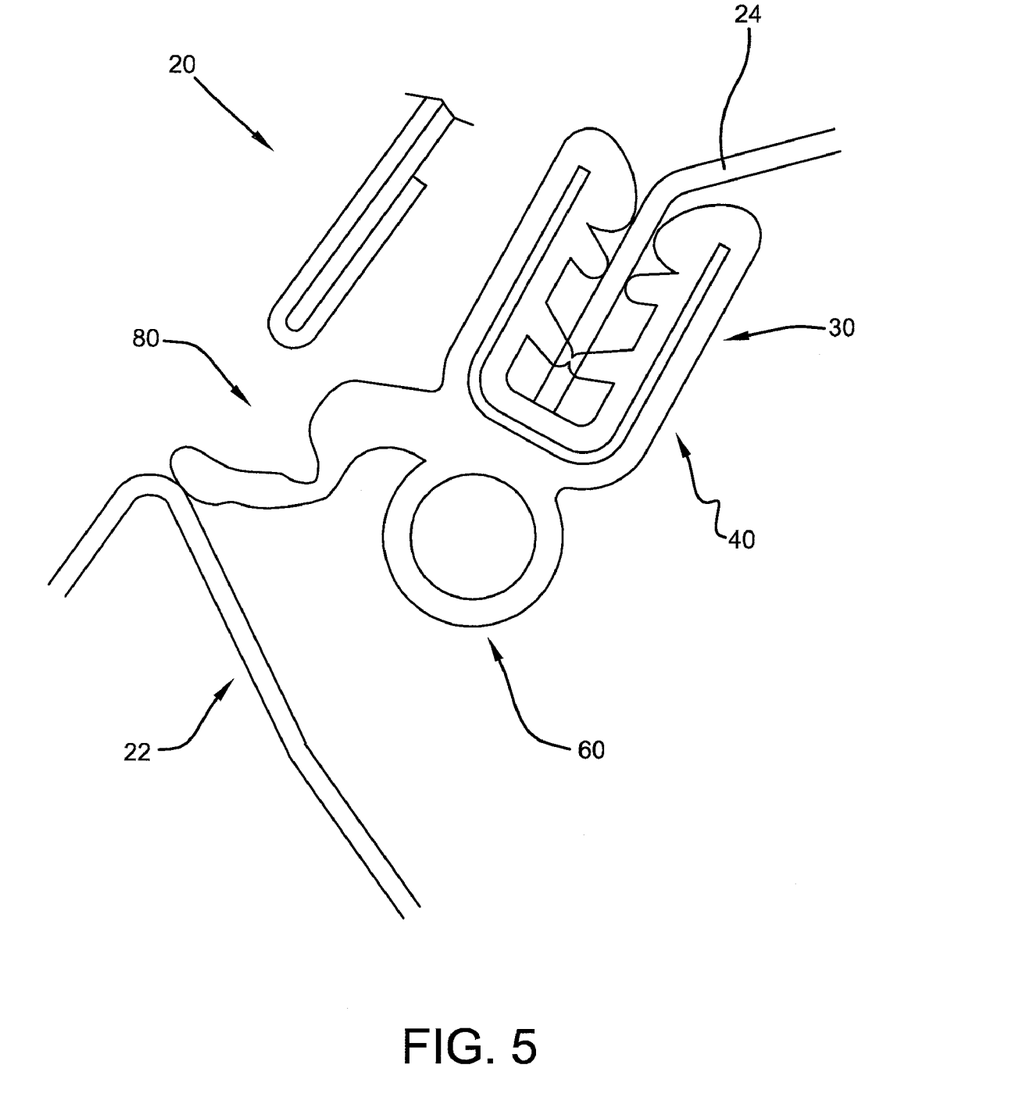
FIG. 5 is a cross-sectional view of a sensor installed on the rear door of the vehicle, according to one embodiment.
Figure 6:
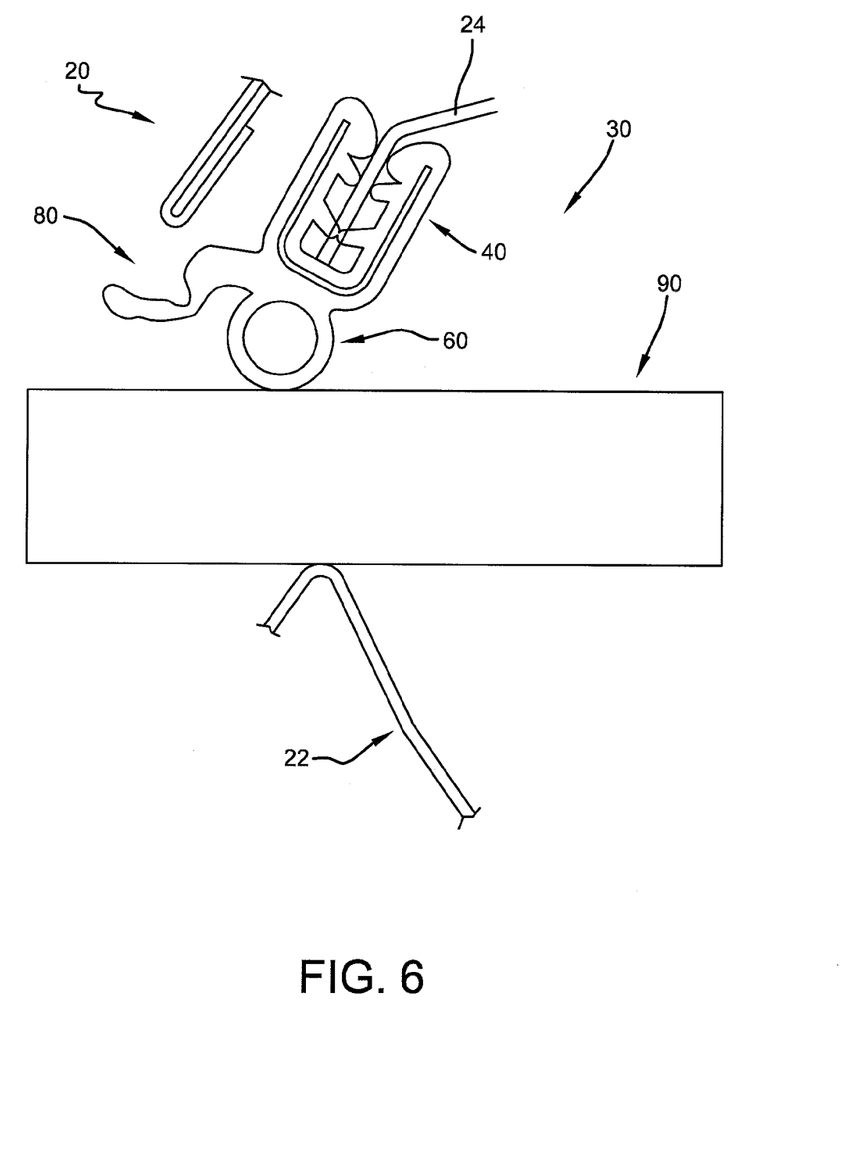
FIG. 6 is a cross-sectional view of a sensor with an object pinched between the rear door and the vehicle body, according to one embodiment.

With reference now to all the FIGURES, the closure member 20 may have a closed position, as shown in FIGS. 1 and 5, and an open position, as shown in FIGS. 2 and 6. The closure member 20 may include the sensor apparatus 30, which senses when an obstruction or object 90 is squeezed or pinched between the closure member 20 and the closure member frame 22, as shown in FIG. 6. In an alternate embodiment, the closure member frame 22 includes the sensor apparatus 30. The closure member 20 may have any automatic or motorized opening and closing system chosen with ordinary skill in the art. If the sensor apparatus 30 detects an object 90 being squeezed or pinched between the closure member 20 and the closure member frame 22 during an automatic closing operation, then the sensor apparatus 30 can stop the closure member 20 from closing. In addition, the sensor apparatus 30 could also cause the closure member 20 to open. This can prevent the object 90 from being damaged.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed.

We claim:

1. A sensor apparatus comprising:
an attachment member defining an interior having a plurality of ribs, the attachment member including substantially parallel first and second side members and a base member substantially perpendicular to the first and second side members, wherein the attachment member is adapted to receive a portion of a closure member of an associated vehicle within the interior;
a sensor housing defining an interior and substantially enclosing an associated pinching sensor within the interior, the sensor housing adjacent the base member of the attachment member, the sensor housing located substantially equidistant from the two side members of the attachment member;
a neck portion connecting the sensor housing to a bottom portion of the attachment member, the neck portion including substantially more material on a first side of the neck portion than on a second side of the neck portion, wherein the ratio of a width of the first side of the neck portion to a width of the second side of the neck portion is between 1.2 and 2.5, wherein the ratio of a width of the interior of the sensor housing to the width of the first side of the neck portion is between 0.8 and 1.8; and a seal extending from the first side of the neck portion, wherein a distal end of the seal contacts a body portion of the associated vehicle when the closure member is in a closed position.

2. The sensor apparatus of claim 1 wherein the seal includes an intermediate pivot point located between the neck portion and a distal end of the seal, the seal including an outer portion extending from the intermediate pivot point to the distal end, wherein the outer portion of the seal pivots about the intermediate pivot point when the seal contacts a body portion of the associated vehicle when the closure member is in a closed position.

3. The sensor apparatus of claim 2 wherein the intermediate pivot point has substantially less material than the adjacent portions of the seal.

4. The sensor apparatus of claim 1 wherein the seal extends from between the sensor housing and the first side member of the attachment member.

5. A sensor apparatus comprising:
  an attachment member defining an interior having a plurality of ribs, the attachment member including substantially parallel first and second side members and a base member substantially perpendicular to the first and second side members, wherein the attachment member is adapted to receive a portion of a closure member of an associated vehicle within the interior;
  a sensor housing defining an interior and substantially enclosing an associated pinching sensor within the interior, the sensor housing adjacent the base member of the attachment member, the sensor housing located substantially equidistant from the two side members of the attachment member;
  a neck portion connecting the sensor housing to a bottom portion of the attachment member, the neck portion including substantially more material on a first side of the neck portion than on a second side of the neck portion; and,
  a seal extending from the first side of the neck portion, wherein a distal end of the seal contacts a body portion of the associated vehicle when the closure member is in a closed position;
  wherein the sensor comprises at least one of the following:
  (a) the ratio of the width of the first side of the neck portion to the width of the second side of the neck portion is between 1.2 and 2.0;
  (b) the ratio of the width of the first side of the neck portion to the width of the second side of the neck portion is between 1.5 and 2.0;
  (c) the ratio of the width of the first side of the neck portion to the width of the second side of the neck portion is between 1.6 and 1.8;
  (d) the ratio of the width of the interior of the sensor housing to the width of the firs side of the neck portion is between 1.0 and 1.6;
  (e) the ratio of the width of the interior of the sensor housing to the width of the first side of the neck portion is between 1.2 and 1.5; and,
  (f) the ratio of the width of the interior of the sensor housing to the width of the first side of the neck portion is between 1.3 and 1.5.

6. The sensor apparatus of claim 5 wherein the ratio of the width of the first side of the neck portion to the width of the second side of the neck portion is between 1.2 and 2.0.

7. The sensor apparatus of claim 5 wherein the ratio of the width of the first side of the neck portion to the width of the second side of the neck portion is between 1.5 and 2.0.

8. The sensor apparatus of claim 5 wherein the ratio of the width of the first side of the neck portion to the width of the second side of the neck portion is between 1.6 and 1.8.

9. The sensor apparatus of claim 5 wherein the ratio of the width of the interior of the sensor housing to the width of the first side of the neck portion is between 1.0 and 1.6.

10. The sensor apparatus of claim 5 wherein the ratio of the width of the interior of the sensor housing to the width of the first side of the neck portion is between 1.2 and 1.5.

11. The sensor apparatus of claim 5 wherein the ratio of the width of the interior of the sensor housing to the width of the first side of the neck portion is between 1.3 and 1.5.

12. A sensor apparatus comprising:
  an attachment member defining an interior having a plurality of ribs, the attachment member including substantially parallel first and second side members and a base member substantially perpendicular to the first and second side members, wherein the attachment member is adapted to receive a portion of a closure member of an associated vehicle within the interior;
  a sensor housing defining an interior and substantially enclosing an associated pinching sensor within the interior, the sensor housing adjacent the base member of the attachment member, the sensor housing located substantially equidistant from the two side members of the attachment member;
  a neck portion connecting the sensor housing to a bottom portion of the attachment member, the neck portion including substantially more material on a first side of the neck portion than on a second side of the neck portion, wherein the ratio of a width of the first side of the neck portion to a width of the second side of the neck portion is at least 1.2, wherein the ratio of a width of the interior of the sensor housing to the width of the first side of the neck portion is at least 0.8; and,
  a seal extending from the first side of the neck portion, wherein a distal end of the seal contacts a body portion of the associated vehicle when the closure member is in a closed position.

13. The sensor apparatus of claim 12 wherein the first and second side members of the attachment member are substantially equal in length and the base member of the attachment member is substantially shorter than the first and second side members.

14. The sensor apparatus of claim 12 wherein the first side member includes a first end rib and the second side member includes a second end rib, wherein the first and second end ribs are substantially the same size.

15. The sensor apparatus of claim 12 wherein the seal extends from between the sensor housing and the first side member of the attachment member.

16. The sensor apparatus of claim 12 wherein a center of the interior of the sensor housing is substantially aligned with both a center of the interior of the attachment member and a center of the base of the attachment member.

17. The sensor apparatus of claim 12 wherein the sensor housing is located between a plane defined by an exterior surface of a length of the first side member and a plane defined by an exterior surface of a length of the second side member.

18. The sensor apparatus of claim 12 wherein the sensor housing is substantially circular.

19. The sensor apparatus of claim 12 wherein the seal includes an intermediate pivot point located between the neck portion and a distal end of the seal, the seal including an outer portion extending from the intermediate pivot point to the distal end. wherein the outer portion of the seal pivots about the intermediate pivot point when the seal contacts a body portion of the associated vehicle when the closure member is in a closed position.

20. The sensor apparatus of claim 19 wherein the intermediate pivot point has substantially less material than the adjacent portions of the seal.

* * * * *